UNITED STATES PATENT OFFICE.

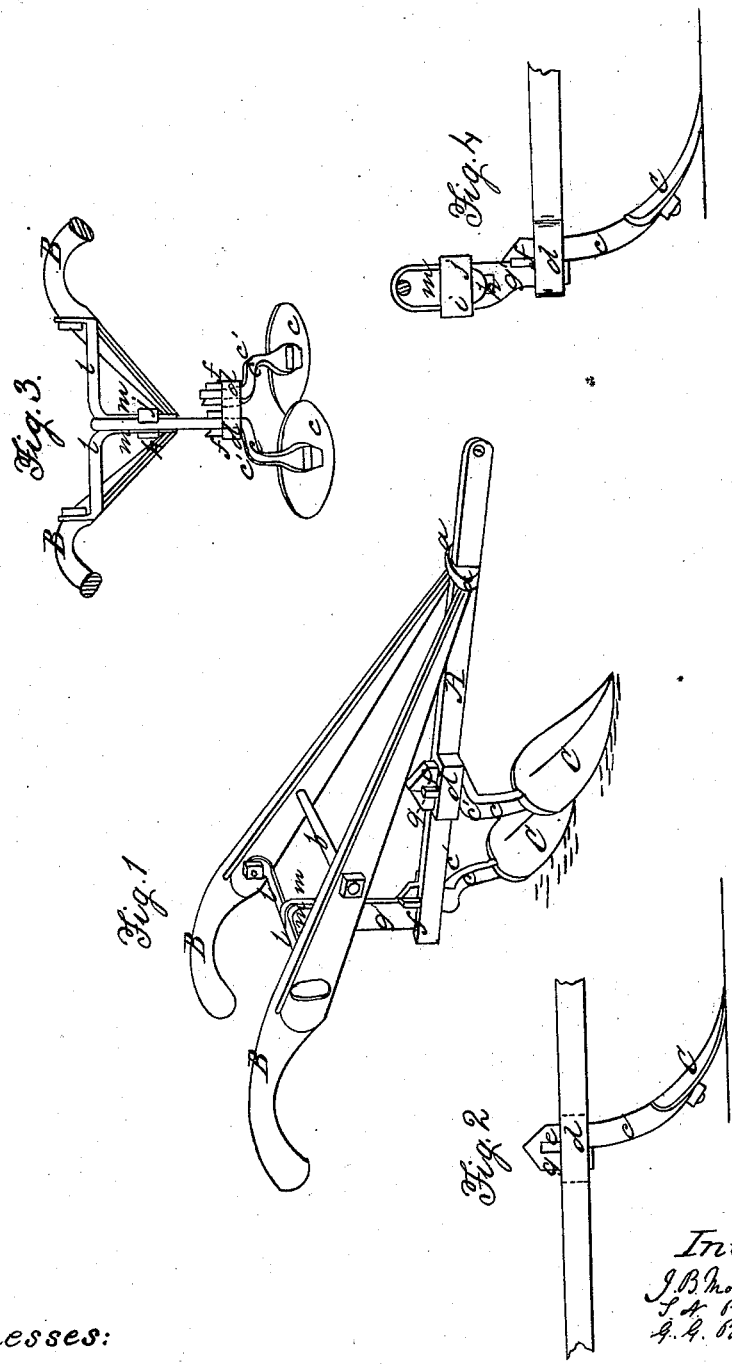

J. B. MOORHEAD, T. A. POOL, AND G. G. POOL, OF BELLEFONTAINE, OHIO.

IMPROVEMENT IN CULTIVATORS.

Specification forming part of Letters Patent No. 33,208, dated September 3, 1861.

*To all whom it may concern:*

Be it known that we, J. B. MOORHEAD, T. A. POOL, and G. G. POOL, all of Bellefontaine, in the county of Logan and State of Ohio, have invented a new and useful Improvement in Cultivators; and we hereby declare that the following is a full, clear, and exact description of the same, reference being had to the accompanying drawings and letters of reference marked thereon, which form part of this specification.

In order that others duly skilled may be enabled to understand and construct our invention, we shall proceed to describe it in detail.

In the accompanying drawings, Figure 1 is a perspective view of our improved cultivator. Fig. 2 is an elevation of the forward cultivator-tooth, showing the manner of its attachment to the beam. Fig. 3 is a rear elevation of cultivator. Fig. 4 is an elevation of rear cultivator-tooth, showing the manner of its attachment to the beam, &c.

Like letters of reference designate like parts in all the drawings.

A is the beam of cultivator, formed in iron.

B B are the handles, the ends of which are inserted into sockets $a$ $a$, formed on beam, and are connected together by the rod $b$.

C C are the cultivator-teeth, the shanks $c$ $c$ of which are formed with a bend, $c'$, the bend in the two shanks being in opposite directions laterally so as to separate the teeth to a considerable distance, although both are attached to beam A.

On the beam A two sockets, $d$ $d$, on opposite sides, are formed for receiving the shanks of cultivator-teeth, the head of said shanks being formed with a square notch, $e$, for receiving a square key, $f$. Another notched piece, $g$, driven in on one side of key $f$, fastens the whole in the socket.

The rear cultivator is attached to the beam in a similar manner to that described already, the notched piece $g'$ being made longer and continued up to form a standard for supporting the handles B B. At the upper end this standard $g'$ is pierced with a long upright slot, $h$. Through this slot the screw-bolt $i$ passes. This bolt is furnished with strap-head $j$ and nut $k$. The arms B B are furnished with iron cross-bars $l$ $l$, bent down at their free ends $m$, and pierced with holes for the reception of screw-bolt $i$, before mentioned. By means of the slot $h$ and screw-bolt $i$ the elevation of the arms B B above the beam may be regulated to suit the stature of the driver of implement.

The advantages of our invention are specially seen in the peculiar method of attaching the cultivator-teeth to beam, whereby they are easily detached, so as to change the teeth, or for repairs and the like: also, in the facility with which the height of handles is or may be regulated, by the device before described, to suit the stature of driver.

Having described our invention, we proceed to state what we claim as our invention and what we desire by Letters Patent to secure:

Arranging the shanks C C with a square notch, $e$, in combination with square key $f$, notched piece $g$, socket $d$, and adjustable handles B B, arranged in the manner and for the purposes herein described.

J. B. MOORHEAD.
T. A. POOL.
G. G. POOL.

Witnesses:
 JNO. BELL,
 JOHN ASHBAUGH.